US005160017A

United States Patent [19]
Goodman et al.

[11] Patent Number: 5,160,017
[45] Date of Patent: * Nov. 3, 1992

[54] ROLLING BALL ASSEMBLY AND DECK

[75] Inventors: John G. Goodman, Alton; Anthony Fernley, Lightwater, both of Great Britain

[73] Assignee: FMC Corporation, Chicago, Ill.

[*] Notice: The portion of the term of this patent subsequent to Sep. 15, 2009 has been disclaimed.

[21] Appl. No.: 548,953

[22] PCT Filed: Jan. 27, 1989

[86] PCT No.: PCT/GB89/00086
§ 371 Date: Sep. 18, 1990
§ 102(e) Date: Sep. 18, 1990

[87] PCT Pub. No.: WO89/07081
PCT Pub. Date: Aug. 10, 1989

[30] Foreign Application Priority Data
Jan. 28, 1988 [GB] United Kingdom ............... 8801911

[51] Int. Cl.$^5$ .................................................. B65G 13/06
[52] U.S. Cl. ................................ 198/789; 198/372; 198/787; 193/35 MD
[58] Field of Search .................. 198/372, 787, 789; 193/35 MD

[56] References Cited

U.S. PATENT DOCUMENTS 4,852,721 8/1989 Stille ............................ 198/789 X

FOREIGN PATENT DOCUMENTS 0180710 5/1986 European Pat. Off. .
0276881 8/1988 European Pat. Off. .
1237003 3/1967 Fed. Rep. of Germany .
1366206 9/1974 United Kingdom .

Primary Examiner—Robert P. Olszewski
Assistant Examiner—Cheryl L. Gastineau
Attorney, Agent, or Firm—Ronald C. Kamp; R. B. Megley

[57] ABSTRACT

A rolling ball assembly for a rolling ball deck with a spherical ball (10), a support for the ball to permit free rotation about any horizontal axis through the ball; a pair of horizontal drive shafts (4, 5), one on either sie of the ball; a collar (8, 9) on each driving shaft, with the periphery of each collar being in driving engagement with the ball at or close to a horizontal plane through the equator of the ball, and between the horizontal axis of the ball perpendicular to the drive shafts and the horizontal axis parallel to the drive shafts so the ball may be rotated about any horizontal axis through rotation of the drive shafts.

16 Claims, 4 Drawing Sheets

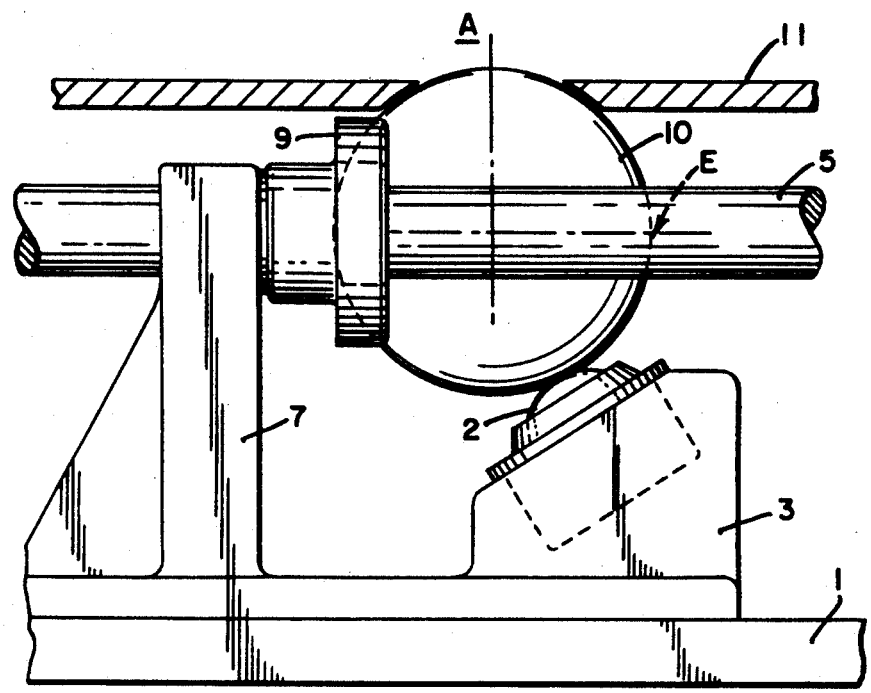
FIG_1
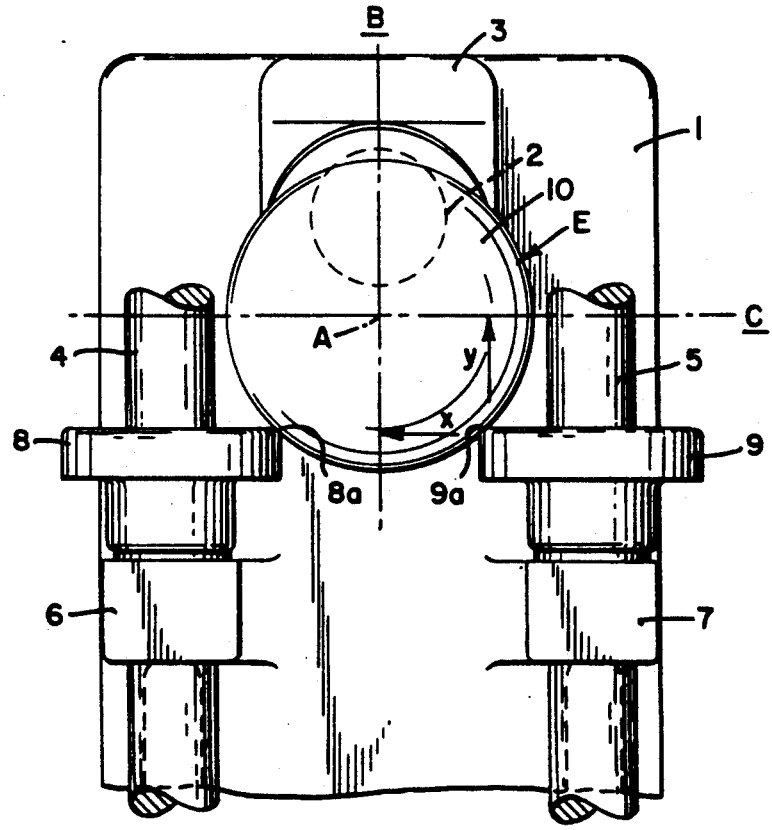
FIG_2

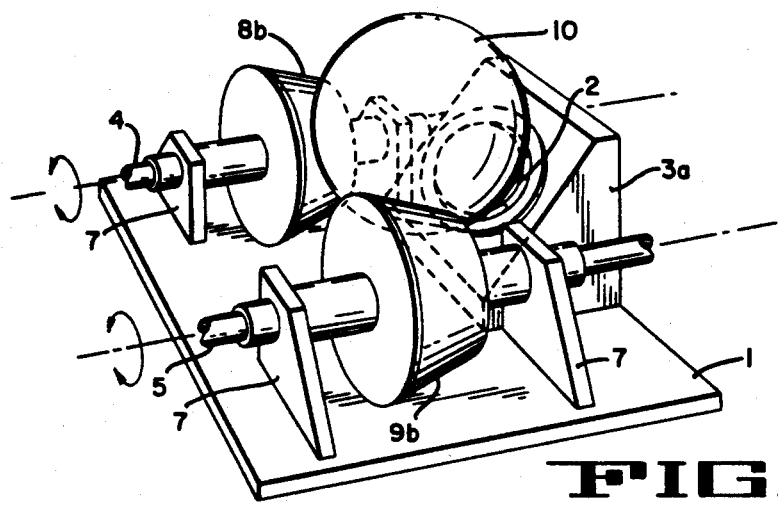
FIG_3
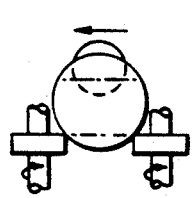 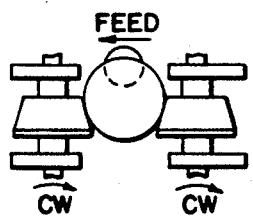 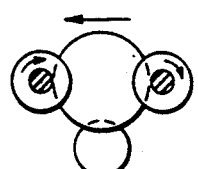
FIG_3A
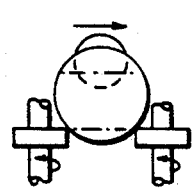 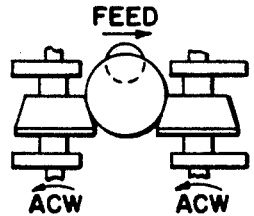 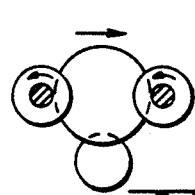
FIG_3B
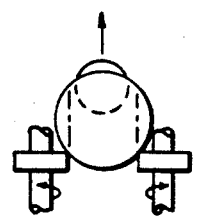 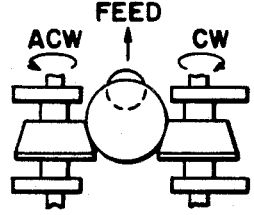 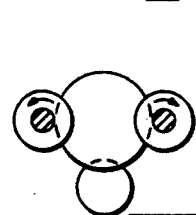
FIG_3C
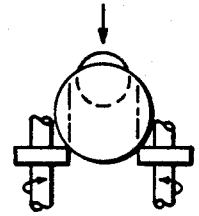 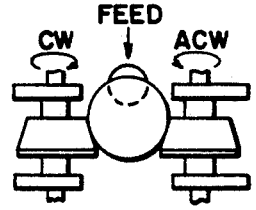 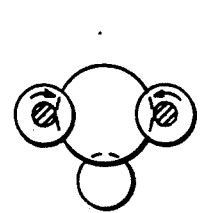
FIG_3D

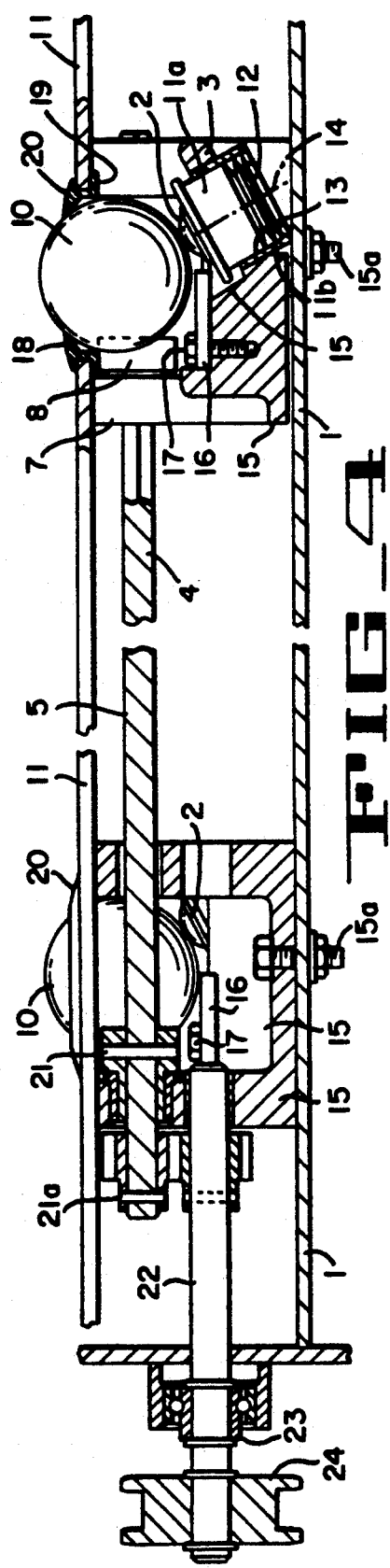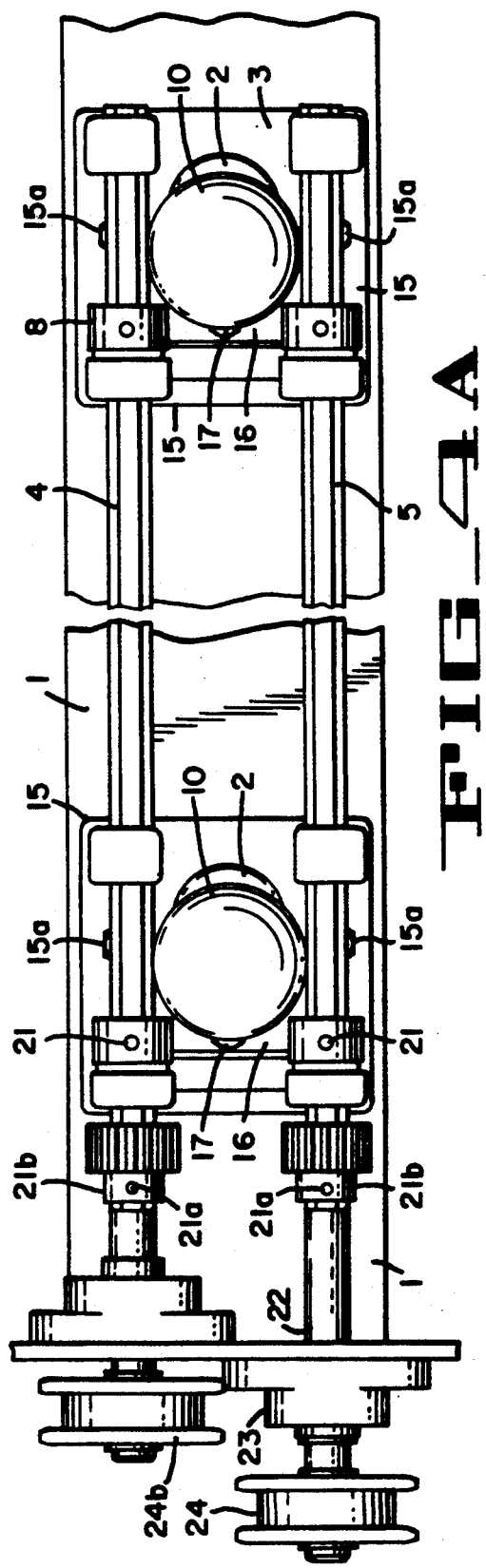

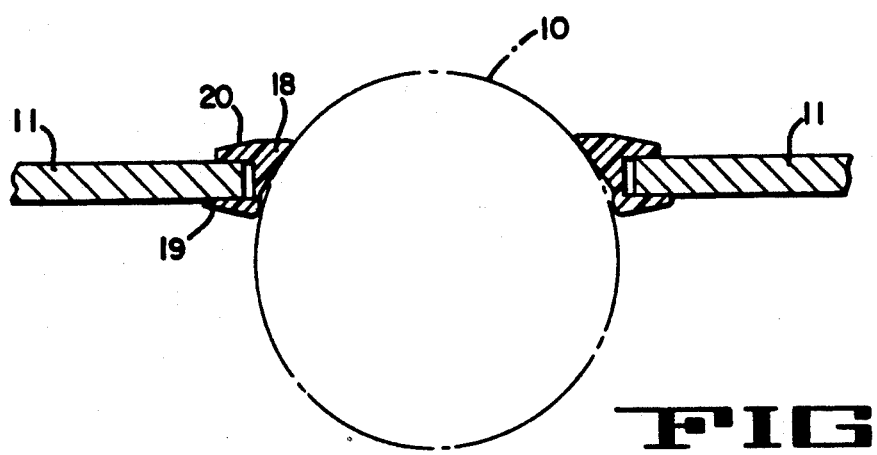
FIG_5
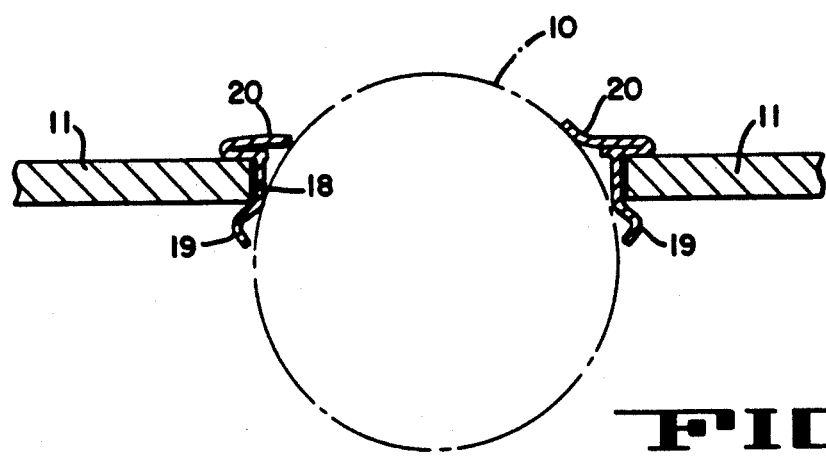
FIG_6
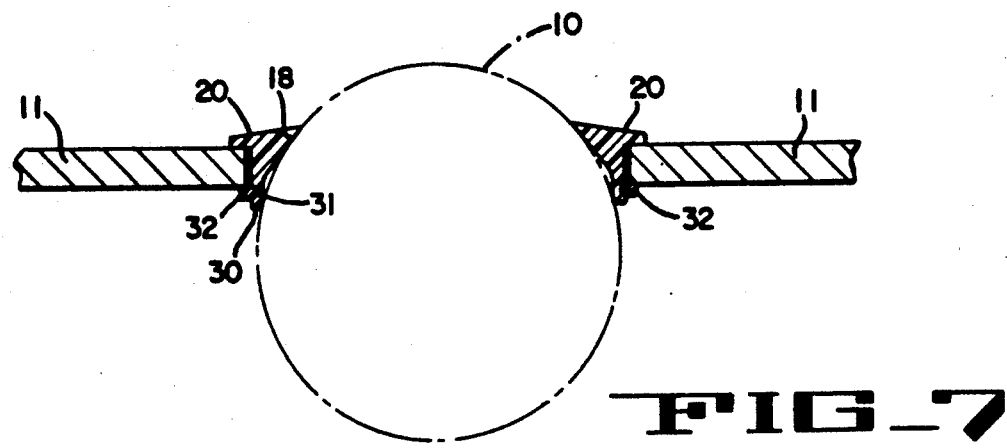
FIG_7

ROLLING BALL ASSEMBLY AND DECK

The present invention relates to a rolling ball assembly for a rolling ball deck, and also to a deck incorporating a plurality of rolling ball assemblies.

Rolling ball decks having a plurality of steel balls supported to be fully rotatable are well known and widely used to assist in the conveyance of articles in warehouses, etc. It is also known to provide rolling ball decks with the balls driven to rotation in one particular direction, and proposals have been made for omnidirectionally rotatable, driven ball decks but these have been complex in construction and consequently expensive to manufacture. One proposal for providing a single, driven rolling ball is to be found in GB-A-1366206, where two perpendicular drive rollers in contact with the driven ball are spaced apart by 90° about the ball for rotating the ball in mutually perpendicular directions.

The present invention seeks to provide a simple, and therefore relatively cheap, driven rolling ball assembly for a rolling ball deck.

According to the invention there is provided a rolling ball assembly for rolling ball deck, comprising a spherical ball, means for supporting the ball for free rotation about any horizontal axis through the ball; a pair of horizontal drive shafts, one either side of the ball; a collar on each driving shaft and a periphery of each collar being in driving engagement with the ball at or close to a horizontal plane through the equator of the ball, and between the horizontal axis of the ball perpendicular to the drive shafts and the horizontal axis parallel to the drive shafts whereby by rotating the drive shafts the ball may be rotated about any horizontal axis.

According to another aspect, the invention provides a rolling ball deck comprising a plurality of rolling ball assemblies as set out above.

Preferred embodiments of the invention will now be described, by way of example only, with reference to the accompanying drawings, wherein:

FIG. 1 is a side-elevation through a rolling ball deck showing an individual rolling ball assembly;

FIG. 2 is a plan view of the rolling ball assembly of FIG. 1,

FIG. 3 is an isometric view of alternative rolling ball assembly using conical collars, FIGS. 3a to 3d show schematically in plan and elevation, a rolling ball assembly in use depicting modes of operation, FIG. 4 is a sectional view of a rolling ball deck incorporating preferred supporting blocks, overload protection and connection to drive means, FIG. 4a is a plan view of FIG. 4 with ball deck cover removed, FIG. 5 is an enlarged partial view taken from FIG. 4 showing a resilient material protective cap arrangement, FIG. 6 is a view corresponding to FIG. 5 but showing an alternative metal protective cap, and FIG. 7 shows a more preferred protective cap.

Referring to FIGS. 1 and 2, an individual rolling ball assembly, forming part of a multiple ball assembly rolling ball deck, generally comprises a base plate 1, a rolling bearing 2, shown as a ball unit, mounted on an inclined face of a flange 3 which projects from the base plate 1, and other components as follows. A pair of parallel drive shafts 4, 5, are rotatably supported in respective brackets 6, 7, which project from the base plate 1. Each drive shaft has an annular collar 8, 9, affixed for rotation therewith, and a driven spherical ball 10 supported on the ball unit 2 between the drive shafts 4, 5, and resting against a corner 8a, 9a, of each of the annular collars 8, 9. An apertured cover plate 11 is positioned over the rolling assembly so that each driven spherical ball 10 has a small clearance from the aperture in the plate and projects freely therethrough to a small distance above the surface of the plate 11.

The rolling bearing 2 is a conventional ball-type rolling bearing or unit with a rolling ball supported in a part spherical bearing. Any functionally similar bearing could be used. The rolling bearing 2 is let in to the inclined face of flange 3. The drive shafts 4, 5, extend to a series of side-by-side rolling ball assemblies in the deck (not shown but see FIGS. 4 and 4a) for simultaneously driving them, and each is connected to a suitable bi-directional drive mechanism, for example an electric motor, through e.g. a belt or chain drive or similar linkage. In the ball deck, all equivalent drive shafts 4 may be connected to one bi-directional drive mechanism (not shown) and equivalent drive shafts 5 to another, single bi-directional drive mechanism.

The collars (8, 9) are mounted on the shafts in any suitable manner, for example by keying or means of cooperating polygonal section on the surface of the shafts and the inside surface of the annular collars (8, 9); generally any manner of securement enables the collars to rotate with the shafts will do. The collars could be formed as integral parts of the drive shafts and may take forms, other than the annular collars shown e.g. conical (as shown in FIG. 3). The annular collars 8, 9, can be generally plain cylindrical, with each corner 8a, 9a, in driving engagement with the spherical ball 10 having a small radius to spread the contact load in use over a greater surface area of the driven ball 10.

The drive ball 10 is supported on the rolling bearing 2 offset from the vertical axis of the ball and in a vertical plane B parallel to and equidistant from the axes of the parallel drive shafts, so that the ball rests against the corners 8a, 9a of the collars 8, 9, and the annular collars engage the driven ball symmetrically about that plane, and at points at or near (just below) the equator E of the driven ball. The contact area between the driven ball and each annular collar is small. The collars are shown contacting the driven ball 10 at points part way between the horizontal axes through the ball, parallel and perpendicular to the drive shafts, and those axes represent the limits between which the points of contact should be. As shown each point of contact is at a point on or just below the equator E of the driven ball substantially equidistant from the plane B defined above and plane C perpendicular to the plane B through the vertical axis A of the ball. This sets spin radii, x, y, through which the driven ball is rotated by the respective collar, to be equal to one another.

All parts are of metal with the collars being hardened steel and the driven ball steel. Other materials could be used, e.g. a spherical ball 10 of hard plastics material, could be used.

FIG. 3 shows a ball unit wherein the driven ball 10 is supported by a rolling ball bearing 2 rotatably mounted upon a substantially solid block 3a rigidly affixed to the base plate 1, and supported by surface parts of conical collars 8b and 9b. Drive shafts 4, 5 are supported in mountings 7 rigidly secured to the base plate.

The operation of an individual rolling ball assembly will now be described, with reference to FIGS. 3a to 3d. Generally, the driven ball 10 is rotated about a horizontal axis through the centre of the ball, by clockwise CW and/or anticlockwise ACW rotation of the drive shaft(s) 4 and/or 5. The drive is imparted to the driven ball at the single point(s) of contact of each of the collars 8, 9 and the ball 10. The direction of rotation of the driven ball is determined by the speed and direction of rotation of the drive shaft(s) and will be explained in detail with reference to the four cases represented by FIGS. 3a, b, c, and d.

In FIG. 3a both shafts are rotated in the same direction (clockwise CW) at the same speed so that the ball is rotated in one direction (feed to the left) about a horizontal axis parallel to axes of the drive shafts, while in FIG. 3b both shafts are rotated in the opposite direction (anti-clockwise ACW) and the driven ball rotated about the same horizontal axis but in the opposite direction (feed to the right).

In FIG. 3c the left hand drive shaft is rotated in an anti-clockwise direction ACW and the right hand shaft in the clockwise CW direction, and the product of the rotational forces on the ball causes the ball to rotate in one direction (forward feed) about a horizontal axis perpendicular to the axes of the drive shafts. In FIG. 3d the shafts are rotated oppositely to the rotation shown in FIG. 3c, i.e. the left hand clockwise CW and the right hand anti-clockwise ACW, and the ball is rotated about the same horizontal axis but in the opposite direction (backward feed). In both the case of FIGS. 3c and d where the shafts are counter-rotated, the speeds of rotation are kept the same to achieve the result shown, but by varying the relative speeds of rotation the direction of rotation can be varied between the limit conditions illustrated. By stopping one shaft and rotating only the other, the driven ball can be rotated in directions at 45° to the axes of the drive shaft.

Referring to FIGS. 4 and 4a of the drawings there are shown preferred modications to the supporting structure and the ball unit 2, to simplify and possibly strengthen the construction and to provide protection against overloading. This arrangement provides a "driven-over" facility enabling depression of the spherical balls 10 and of the ball bearings 2 upon application of an overload, e.g. a vehicle wheel and thereafter permit return of these items to normal, operational position in the absence of overload. The arrangement comprises a spring loaded ball unit assembly 11a, capable of displacement in a vertical plane through the centre of rotation of said ball unit. The ball unit 2 is supported in an inclined face 3 of one web of an integrally formed mounting block 15, supporting the drive shafts 4,5 in webs 7 thereof.

Within a cylindrical aperture 13 in web 3 a spring cup 13 includes disc-type springs 12. The ball bearing 2 projects above a flange on its housing 11a. The ball unit 2 and housing can be displaced as a unit on the axis 14 within the cup 13 when sufficient (over-) load is applied to the spherical ball 10 to overcome predetermined tension in the disc springs 12. Deflection of the spherical ball 10 is limited by a stop member in the form of supporting plate 16 bolted at 17 to rest on a ledge of the block 15. Thus when the ball 10 is overloaded, it will rest on the stop member 16 the ball unit 2 and associated housing 11a being correspondingly deflected in the cup 13 such that damage thereto is minimised or avoided.

FIGS. 4 and 4a also show an arrangement of protective cap 18, 19, 20 to be described subsequently with reference to FIG. 5. The collars 8, 9 are shown pinned at 21 to the shaft 5 which has a hexagonal cross-section to engage corresponding hexagonal bores in the collars. Shaft 4 is shown connected for bi-directional drive to a driving shaft 22 through gearing 21b keyed to the respective shafts at 21a. Similar driving provision is made for the other shaft. Said driving shaft 22 projects beyond an end of the assembly to be supported within a bearing 23 and having at its remote end a pulley 24 for connection to an appropriate bi-directional drive system (not shown). One-piece blocks 15 are conveniently bolted at 15a to the base plate 1 and a series thereof spaced along said base plate in longitudinal and lateral rows. In normal load transporting use, the strength of springs 12 will be such that the spherical balls retain their position as shown in FIG. 4 to deflect only in an overload situation.

Referring to FIG. 5 of the drawings a protective cap of a resiliently flexible plastics or elastomeric material 18 has an upper surface part 20 extending between a surface part of the ball 10, over the aperture in the top plate 11 and over a peripheral edge of the aperture as shown. The under surface 19 of a protective cap 18 extends similarly over the peripheral edge of that aperture. The protective cap is provided with an internal shape in general conformity with the contour of the spherical ball, having nominal, if any, clearance therefrom. With the cap being of flexible material and incorporating an annular recess, the cap can be inserted into the top plate normally. In use the cap can be self-aligning with the driven ball as the diameter of the recess of the cap is less than the aperture of the top plate so that shape and/or dimension imperfections during manufacture of the driven ball and/or the apertures in the top plate can be better tolerated in use.

The arrangement of protective cap 20 shown in FIG. 6 has similar overlapping construction to the arrangement shown in FIG. 5 but is constructed of metal. Thus it has an annular recess and an upper part 20 extending over an upper peripheral part of the top plate defining the aperture and over a lower peripheral part thereof. The cap 20 can be manufactured as a steel pressing or in the form of a steel plate having three or more spring clips welded or riveted thereto.

As shown in FIG. 7 the protective cap whether of resiliently flexible or metal material may have a downwardly depending spigot 30 projecting through the aperture in the top plate 11. The spigot has a circumferential groove 31 below the top plate for receiving a retaining member in the form of a circlip 32. Such preferred arrangement helps prevent dislodgement of the protective cap in use and may control motion of the ball 10 more accurately.

We claim:

1. A rolling ball deck apparatus having at least one rolling ball assembly, each rolling ball assembly comprising a spherical ball, means for supporting the ball for free rotation about any horizontal axis through the ball; a pair of horizontal drive shafts, one either side of the ball; a collar on each driving shaft and a periphery of each collar being in driving engagement with the ball at or close to a horizontal plane through the equator of the ball, and between the horizontal axis of the ball perpendicular to the drive shafts and the horizontal axis parallel to the drive shafts whereby by rotating the drive shafts the ball may be rotated about any horizontal axis.

2. An apparatus as claimed in claim 1 wherein the ball is supported by said collars and by a rolling bearing.

3. An apparatus as claimed in claim 2 wherein the rolling bearing comprises a rotatable ball disposed beneath said spherical ball and whose centre of rotation lies in a vertical plane generally equi-distant from the horizontal axes of said drive shafts.

4. An apparatus as claimed in claim 1 including a base plate upon which said means for supporting said spherical ball is mounted and brackets on said base plate for rotatably supporting said shafts.

5. An apparatus as claimed in claim 4 wherein said means for supporting said spherical ball comprises a rolling ball bearing mounted upon an inclined face of a flange which flange projects from said base plate.

6. An apparatus as claimed in claim 5 wherein said rolling bearing is spring loaded to be capable of displacement in a vertical plane extending through its centre of rotation, upon application of a load above a predetermined value to said spherical ball.

7. An apparatus as claimed in claim 6 incorporating a stop member to limit depression of said spherical ball when said spring loaded rolling bearing is displaced to overcome its spring loading.

8. An apparatus as claimed in claim 1 including an apertured cover plate positioned such that said spherical ball projects through an aperture to a distance above the surface of said plate.

9. An apparatus as claimed in claim 8 wherein at least one aperture in said cover plate are provided with a ball cap having parts which project both below and above said plate, and constructed to be self aligning with respect to said spherical ball in accommodating minor tolerance deviations in said aperture and/or said spherical ball.

10. An apparatus as claimed in any preceding claim wherein the collars are generally plain cylindrical, corners thereof contacting the spherical ball in driving engagement.

11. An apparatus as claimed in claim 10 wherein the corners in driving engagement have a radius.

12. An apparatus as claimed in claim 1 wherein the collars have a conical periphery in driving engagement with said spherical ball.

13. An apparatus as claimed in claim 1 wherein a one-piece supporting block is used for mounting of said supporting means, said supporting block being securely attached to a base plate.

14. An apparatus as claimed in claim 1 wherein the drive shafts extend to a series of side-by-side rolling ball assemblies for simultaneously driving them.

15. An apparatus as claimed in claim 14 having multiple spherical balls and one or more pairs of drive shafts with an apertured cover plate through which said spherical balls project, each drive shaft connected to a bi-directional drive mechanism.

16. An apparatus as claimed in claim 15 wherein a series of shafts are linked to the same drive mechanism.

* * * * *